US008745055B2

(12) United States Patent
Suarez (10) Patent No.: US 8,745,055 B2
(45) Date of Patent: Jun. 3, 2014

(54) CLUSTERING SYSTEM AND METHOD

(75) Inventor: Eduardo Suarez, Marlow (GB)

(73) Assignee: Symantec Operating Corporation, Mountain View, CA (US)

( * ) Notice: Subject to any disclaimer, the term of this patent is extended or adjusted under 35 U.S.C. 154(b) by 1154 days.

(21) Appl. No.: 11/529,162

(22) Filed: Sep. 28, 2006

(65) Prior Publication Data

US 2008/0082531 A1    Apr. 3, 2008

(51) Int. Cl.
*G06F 7/00* (2006.01)
*G06F 17/30* (2006.01)

(52) U.S. Cl.
USPC .......................................... 707/737; 707/749

(58) Field of Classification Search
None
See application file for complete search history.

(56) References Cited

U.S. PATENT DOCUMENTS

| 7,194,483 | B1 * | 3/2007 | Mohan et al. | 707/104.1 |
|---|---|---|---|---|
| 2004/0172378 | A1 * | 9/2004 | Shanahan et al. | 707/1 |
| 2004/0236729 | A1 * | 11/2004 | Dingledine et al. | 707/3 |
| 2005/0022106 | A1 * | 1/2005 | Kawai et al. | 715/500 |
| 2006/0074861 | A1 * | 4/2006 | Wilensky | 707/3 |
| 2007/0112898 | A1 * | 5/2007 | Evans et al. | 707/205 |

OTHER PUBLICATIONS

Weisstein; "K-Means Clustering Algorithm." From MathWorld—A Wolfram Web Resource; Internet; http://mathworld.wolfram.com/K-MeansClusteringAlgorithm.html; available from the Internet at least as early as Sep. 28, 2006.
Ohta; "Clustering Algorithm for Large-Scale Databases;" Fujitsu Laboratories Ltd., Japan; 'Internet; http://www.ece.northwestern. edu/~harsha/Clustering/yuiko.ps; available from the Internet at least as early as Sep. 28, 2006.
"Principal Components and Factor Analysis;" StatSoft, Inc., Internet; http://www.statsoft.com/textbook/stfacan.html; available from the Internet at least as early as Sep. 28, 2006.
"Hierarchical Clustering;" Resampling Stats, Inc.; Internet; http:// www.resample.com/xlminer/help/HCIst/HCIst_intro. htm; available from the Internet at least as early as Sep. 28, 2006.
Nanni; "Speeding-Up Hierarchical Agglomerative Clustering in Presence of Expensive Metrics;" Internet; http://ercolino.isti.cnr.it/ mirco/papers/pakdd2005-Nanni-LNAI-version.pdf; available from the Internet at least as early as Sep. 28, 2006.

* cited by examiner

*Primary Examiner* — Cheryl Lewis
*Assistant Examiner* — Raheem Hoffler
(74) *Attorney, Agent, or Firm* — Meyertons Hood Kivlin Kowert & Goetzel, PC (57) ABSTRACT

In order to clustering documents, document vectors are formed for each of a plurality of documents of a corpus and plurality of reference vectors is generated. The document vectors are then compared to the reference vectors to generate similarity values for each of the document vectors. The document vectors are then sorted based on the similarity values for the document vectors to form a sorted list. Clusters are then formed based on the similarity between adjacent document vectors in the sorted list.

21 Claims, 10 Drawing Sheets

CLUSTERING SYSTEM AND METHOD

BACKGROUND

1. Field of the Invention

This invention relates to document analysis, and in particular to a system and method for automatic and unsupervised clustering of unformatted text documents.

2. Related Art

In the realm of data management, "clustering" is the grouping of documents into related and similar buckets ("clusters") for ease of processing and reviewing. Unsupervised clustering (i.e., clustering without user control or intervention) is becoming a required feature when processing search results, for example in the legal compliance and discovery environment.

There are many conventional text clustering algorithms.

For example, http://mathworld.wolfram.com/K-MeansClusteringAlgorithm.html describes a K-Means algorithm which requires that the number of clusters be defined a priori. For this reason, the K-Means algorithm is not very useful when trying to discover unknown patterns, which by definition will require an unknown number of clusters.

Another example of a clustering algorithm is described at http://ksi.cpsc.ucalgary.ca/AIKM97/ohta/yuiko.html, where there is described a clustering algorithm that builds a concept hierarchy based on multiple-inheritances. This multiple-inheritance structure can result in exponentially increasing numbers of required document comparisons, which can make the technique computationally very expensive.

At http://www.statsoft.com/textbook/stfacan.html other methods of reducing the large vector space using techniques such as Principal Component Analysis and Latent Semantic Analysis are identified. These techniques are based on reducing the number of "terms" in the vector by for example, reducing the words to their root (or stem), or by finding the principal components of a vector by statistical factor analysis. However, the techniques do nothing to reduce the actual number of vector comparisons when clustering, and therefore remain computationally expensive.

Papers at http://www.resample.com/xlminer/help/HClst/HClst_intro.htm and a at http://ercolino.isti.cnr.it/mirco/papers/pakdd2005-Nanni-LNAI-version.pdf describe the standard and optimized HAC algorithm. The complexity of standard HAC algorithm is $[N^2(LogN)]$, with improvements of $N^2$ to $[N LogN]$. The second of these papers suggests using approximated values for calculating document similarities based on the principle that if A is similar to B and B is similar to C, then A is also similar to C. In which case A is given a similarity value to C based on its similarity to B. The approach may not be particularly accurate since it assumes that the similarity between vectors is a transitive property of a domain (which may not be the case).

At http://www.ics.uci.edu/.about.eppstein/projects/pairs/Talks/ClusterGroup.pdf different methods of speeding clustering algorithms are described.

For many of the reasons described above, conventional unsupervised clustering can typically only process up to a few hundred documents before requiring large amounts of memory and/or processor time, or requiring multiple parallel computers. It would therefore be desirable to provide an approach to unsupervised clustering that can scale up to hundreds of thousands of search result documents for use in, for example, legal compliance and discovery applications.

SUMMARY

Conventional clustering algorithms are extremely computationally expensive due to exponential growth rate of document comparisons that result from such algorithms. By comparing a document vector for each of the documents in a corpus (a set of documents to be analyzed) to a set of reference vectors, similarity values can be generated for the documents, and those similarity values can then be used to sort the document vectors so that similar document vectors are closer to one another. This then facilitates the formation of document clusters, thereby reducing the overall number of comparisons required to perform a clustering operation to a linear function of the number of documents in the corpus. Such a technique can therefore enable significantly less computationally expensive clustering operations than would be possible using conventional algorithms.

In one embodiment, a comparator can be operable to compare the document vectors to each of the reference vectors to generate similarity values for each of the document vectors. A sorter can then be operable to sort the document vectors based on the similarity values for the document vectors to form a sorted list. A cluster generator can then be operable to form the final clusters of documents based on the similarity between adjacent document vectors in the sorted list.

An embodiment of the invention can provide a computer implemented method of clustering documents. The method can include: generating document vectors for each of a plurality of documents of a corpus; generating a plurality of reference vectors; comparing the document vectors to each of the reference vectors to generate similarity values for each of the document vectors; sorting the document vectors based on the similarity values for the document vectors to form a sorted list; and forming clusters of documents based on the similarity between adjacent document vectors in the sorted list.

An embodiment of the invention can provide a computer program operable to carry out the steps of the method.

An embodiment of the invention can provide unsupervised clustering of large numbers of unformatted text documents by analyzing the content similarity. Fast and scalable auto-clustering of, for example, thousands of documents can be provided in linear time. An example embodiment can provide the advantages of a Hierarchical Clustering algorithm (i.e. no requirement for setting the number of clusters a priori), with the speed and scalability of other clustering algorithms, where the number of clusters has to be specified at the start. An example embodiment can provide a fast method of clustering wherein each document effectively is deemed to belong to only one cluster and where a mapping algorithm is used to minimise the number of required document comparisons.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE FIGURES

Specific embodiments of the present invention will now be described by way of example only with reference to the accompanying Figures in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

This invention provides a new system and method for unsupervised clustering of a large number of unformatted text documents by analyzing the content similarity. An embodiment of the invention can provide for fast and scalable auto-clustering thousands of documents in linear time.

Unsupervised clustering algorithms are extremely useful when trying to group data based on unknown patterns in the content. This is very complex and CPU intensive when the algorithm must group a large number of text files or emails.

Unsupervised clustering algorithms, such as Hierarchical Agglomerative Clustering algorithm (HAC), are very memory and CPU intensive. The complexity of these algorithms rises exponentially with the number of documents to be processed. Auto-clustering N text documents requires building a table of $N*(N-1)$ similarity values between documents.

The comparison between documents is normally based on the cosine distance between two document's Term Frequency Vectors, although other methods such as the Euclidian distance are also utilized. Calculating the cosine or Euclidian distance between two large Document Term Vectors (potentially hundreds of terms), is very CPU intensive.

Figure 1:
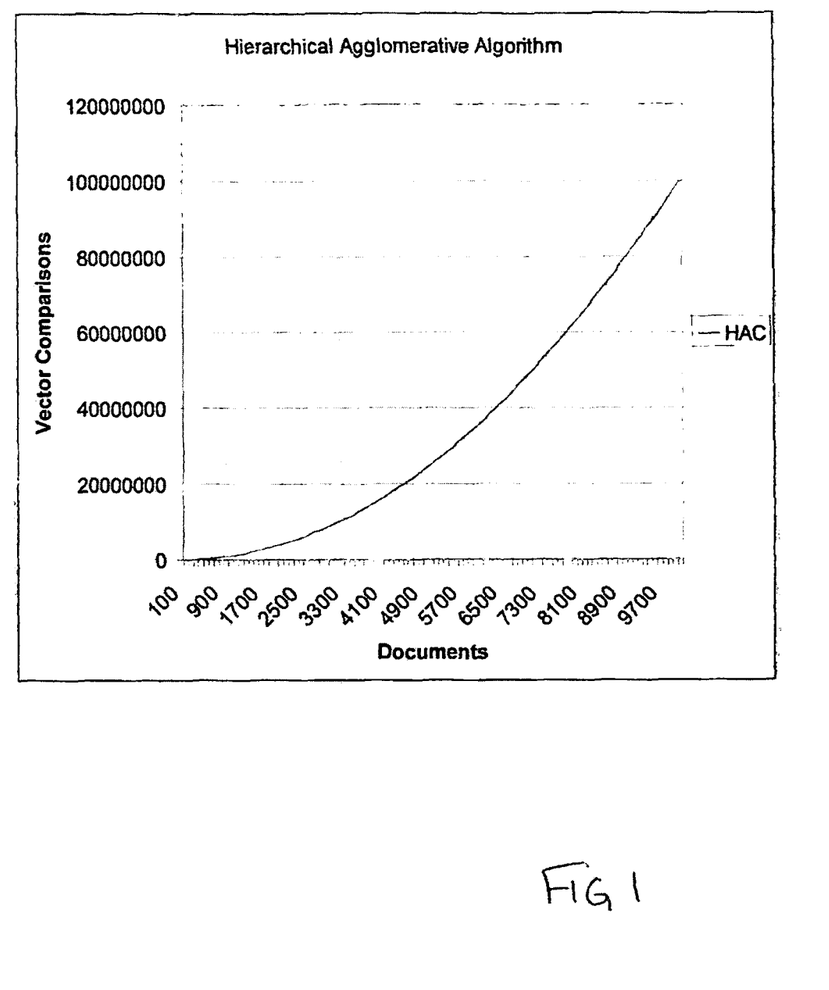
FIG. 1 is a graph representing Hierarchical Agglomerative Clustering Algorithm (HAC) vector comparisons per document.

For example, clustering 10,000 documents would require 99,990,000 document-vector comparisons. Such an algorithm can provide for an unlimited and unknown number of clusters, but at the expense of very high computational requirements. Such an algorithm is not recommended for more than a few hundred documents. FIG. 1 is a graph representing the number of document vector comparisons related to the number of documents for a HAC algorithm.

A known suggested approach can be based on parallel clustering across multiple computers or using document similarity estimations (i.e. A similar to B, B similar to C, assume A similar to C).

Other known clustering algorithms simplify the task by deciding "a priori" a final number of clusters "K". Such algorithms then choose at random the documents in those K sets. Every document is then iteratively moved to the cluster whose centroid is closest to it. This process is repeated until a stop criterion is met. Examples of this type of algorithm are Self-Organizing Maps (Kohonen networks) and the K-Means clustering algorithm. The problem and limitation of these algorithms is that one must provide the number of desired clusters before running the algorithm. This seems to defeat the object of "discovering" unknown clusters and patterns in the data.

These algorithms all require the use of Term Frequency-Inverse Document Frequency (TF-IDF) document vectors. A document vector is formed from terms found in a document plus their TF-IDF score for that document.

The document terms can be formed from individual words, phrases, groupings of words or phrases, etc. A set of terms can be chosen for a particular example implementation according to user-specified requirements. A given document may only contain a subset of the complete set of terms.

A TF-IDF weighting, or score, forms a statistical measure used to evaluate how important a word is to a document. The importance is deemed to increase linearly according to the number of times a word appears in the document, but is offset by how common the word is in all of the documents in a body of documents, or corpus.

Various formulae can be used to compute a TF-IDF. In one example, the term frequency (TF) can be the number of times the word appears in a document divided by the total number of words in the document. If a document contains 1000 total words and a word appears 5 times, then the term frequency of the word in the document is 0.005 (5/1000). In this example, the document frequency (DF) can be computed as the number of documents that contain the word divided by the total number of documents in the corpus. If the word appears in 1,000 documents out of a total of 10,000,000 then the document frequency (DF) is 0.0001 (1000/10000000) and the Inverse Document Frequency (IDF or 1/DF) is 10,000. The TF-IDF score is then calculated by dividing the term frequency by the document frequency (TF/DF) or multiplying the term frequency by the Inverse Document Frequency (i.e., TF*IDF). In the example described above, the TF-IDF score for the corpus would be 50 (0.005/0.0001 or 0.0005*10,000). It can be seen that a high TF-IDF score will result from a high term frequency (in the given document) and/or a low document frequency of the term in the whole collection of documents; whereby the weights tend to filter out common terms. In other examples, other formulae can be employed to calculate the TF-IDF score.

Indeed, a commonly used Term Frequency-Inverse Document Frequency formula uses the natural logarithm of the Inverse Document Frequency (Ln(IDF)). IN this case, for a term appearing in all documents, $Ln(1)=0$. If a term appears only in 1 document among 10,000,000, then $Ln(10,000,000)=16$.

An embodiment of the present invention can provide the advantages of "Unlimited Discovery" as in Hierarchical Agglomerative Clustering algorithms (HAC), with the speed and scalability required for thousands of documents.

An example embodiment of the invention provides a process that enables clustering of documents based on efficient document comparison in order to decrease the computational requirements. This process is employs mapping of TF-IDF document vectors (hereinafter document vectors) to a multi-dimensional space (e.g., a 2 or 3D space), for example by using the cosine distance of each vector to fixed vectors in that space.

An example embodiment of the process is described with reference to FIG. 2, wherein a process is operable to computer is operable to provide automatic clustering of documents based on document vectors.

In step 102, the process generates a document vector for each document of a corpus of N documents.

In step 104, the process generates first and second reference vectors containing all the relevant terms that appear in the N document vectors. In this example the terms are given a random TF/IDF value for each reference vector. The random value may a true random number or a random number generated, for example, by a pseudo-random number generator. These reference vectors remain constant throughout the clustering process. In the present example, two reference vectors are used (forming a two-dimensional space) that will be identified as Random Vector X and Random Vector Y, respectively. This is a very fast process. It should be appreciated that this is for the purposes of illustration only. In another example, another number of random vectors (for example three random vectors Random Vector X and Random Vector Y and Random Vector Z, respectively, for a three dimensional space).

In step 106, each document vector is then compared (for example using the cosine distance between vectors) to each reference vector. This process generates 2 similarity values for each document. The similarity values are named Xi and Yi representing the similarity between Document Di and Random Vectors X and Y. These Xi and Yi values map each original document into a 2D vector space. Assuming that there are N vectors in the corpus, the complexity so far: (2*N). This step effectively maps the document vectors to an M dimensional space (here M=2)

In step 108, the N documents are then sorted in ascending or descending order by Xi and Yi coordinates. This groups together those documents with similar characteristics into a sorted document list.

Any hash or mapping algorithm that attempts to compress a large vector space into a limited number of dimensions, such as the process described above with reference to steps 102 to 108, is bound to experience collisions. Collisions in this algorithm occur when two different documents are mapped to similar X and Y coordinates.

Accordingly, in step 110, this property is used to form document clusters for the corpus of N documents, based on comparing each document in the sorted list of documents formed in step 108 with the immediately following document in the sorted list of documents. In other words, in the sorted list, document 1 is compared with 2, 2 with 3, 3 with 4, etc. This requires N−1 comparisons.

Figure 3:
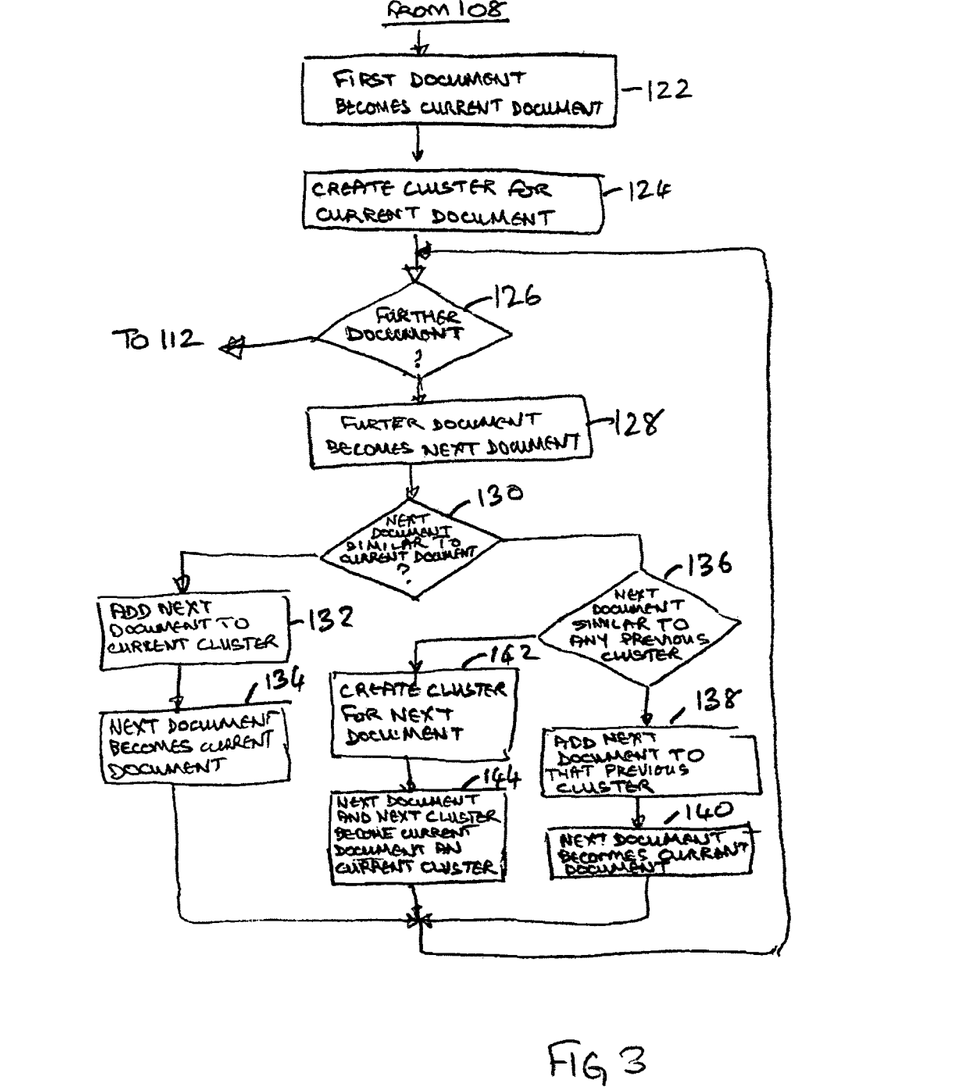
FIG. 3 is a flow diagram for the operation of part of the method of FIG. 2.

FIG. 3 is a flow diagram illustrating an example embodiment of step 110. In this example process, the process iterates through the sorted document list for each of the N documents. At this point the real similarity between adjacent documents is known.

Turning to FIG. 3, in step 122. the process designates a first document (document 1) in the sorted list as the current cluster, and in step 124 it creates a first cluster for the current document. As well as the first document, the cluster also includes a cluster vector, as will be described later.

In step 126, if it is determined that there is a further document, then in step 128 the further document is designated the next document.

In step 130, the process detects whether the next document has at least a predefined similarity to the preceding document. The similarity between two adjacent vectors can be calculated using, for example, the cosine distance between the two document vectors. The "predefined similarity" provides a threshold to determine whether two documents are similar enough to be grouped together. The "predefined similarity" can be determined using a similarity threshold to define whether two documents are sufficiently similar to belonging to the same cluster. If the next document has at least the predefined similarity to the preceding document, then in step 132, the next document is added to the cluster for the current document. For example, in the first iteration, if document 2 is sufficiently similar to document 1, then in step 132, document 2 is added to the cluster for document 1.

In step 134, the process then designates the next document the current document and then the process returns to step 126.

If, in step 130, it is determined that the next document does not have at least the predefined similarity to the current document, then optionally, in step 136, a comparison can be made between the next document and each other previously created cluster. At this point, the process compares the document's vector with a previously created cluster's vector. For the first iteration, there will only be the cluster created for document 1. However, in subsequent iterations, there may be further clusters as will become clear in the following.

As mentioned earlier, a cluster includes a cluster vector. A cluster vector can be maintained for each cluster by combining the terms (and TF/IDF values) of the documents vectors of that cluster. When a cluster is created, the cluster vector is also generated. When the cluster contains a single document vector, the cluster vector will have the same content as the document vector. When a new vector is added to a cluster, the cluster vector for that cluster can be updated to take account of the new document cluster by combining the terms (and TF/IDF values) of the document vector for the new document with the existing cluster vector of that cluster. This means that a new document can be compared to a cluster of documents by comparing the document vector for the new document to the one vector that represents the cluster, rather than having to compare the document vector for the new document against the document vector of each document of the cluster. The cluster vector can also be used to group clusters together as will be described later.

If, in step 136, the process determines that the next document has at least a predefined similarity to the previously created cluster, then in step 138 the next document is added to that cluster. In step 140, the process then designates the next document the current document and then the process returns to step 126.

If, in step 136, it is determined that the next document does not have at least the predefined similarity to a document of a previously created cluster, or if step 136 is not performed, then in step 142 a new cluster is created for the next document. For example, in the first iteration, if document 2 is not sufficiently similar to document 1, there will be no other previously created cluster and therefore in step 142, a new cluster will be created for document 2. In step 144, the process then designates the next document the current document and designates the new cluster the current cluster, and then the process returns to step 126.

The process of steps 126 to 144 is thereby repeated until there are no more documents (i.e. the Nth document), each time comparing document Di with Di+1. At this time, the process of FIG. 3 completes iterating through N documents in the sorted list. At this point there should be K clusters. The process then returns from step 126 to the process of FIG. 2.

Figure 2:
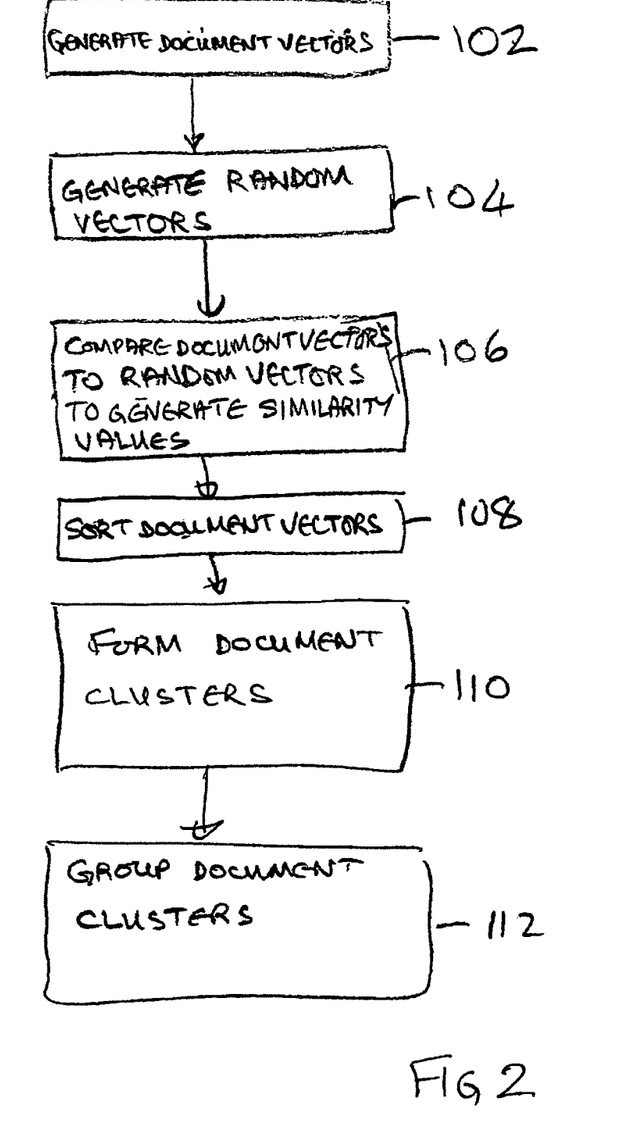
FIG. 2 is a flow diagram for the operation of an example of a method of the invention.

A further, optional, step 112 represented in FIG. 2 is to attempt to group clusters together. Grouping clusters together requires iterating through the K clusters, comparing the cluster vector of cluster Ci with the cluster vector of cluster Ci+1 and deciding whether to merge the clusters or add Ci+1 as a subcluster of cluster Ci. This step can be optionally run iteratively or recursively until a predetermined number of top level clusters or until the similarity between clusters falls below certain threshold.

The complexity for the process explained with reference to FIG. 3 for a 2 dimensional mapping space can be expressed as the number of comparisons between documents (and clusters), approximately 2N+N−1+(K Cluster comparisons). The K cluster comparisons step can be optionally employed where it is desired to group documents into a smaller number of top level clusters.

As indicated above. although the process is described with reference to FIGS. 2 and 3 for a two dimensional space based on first and second reference vectors, another embodiment could be based on an M dimensional space with M reference vectors. Also, although a particular set of steps is described, it will be appreciated that different steps and/or a different ordering of the steps could be employed.

FIGS. 4 to 7 are schematic representations of steps of the process described with reference to FIGS. 2 and 3.

Figure 4:
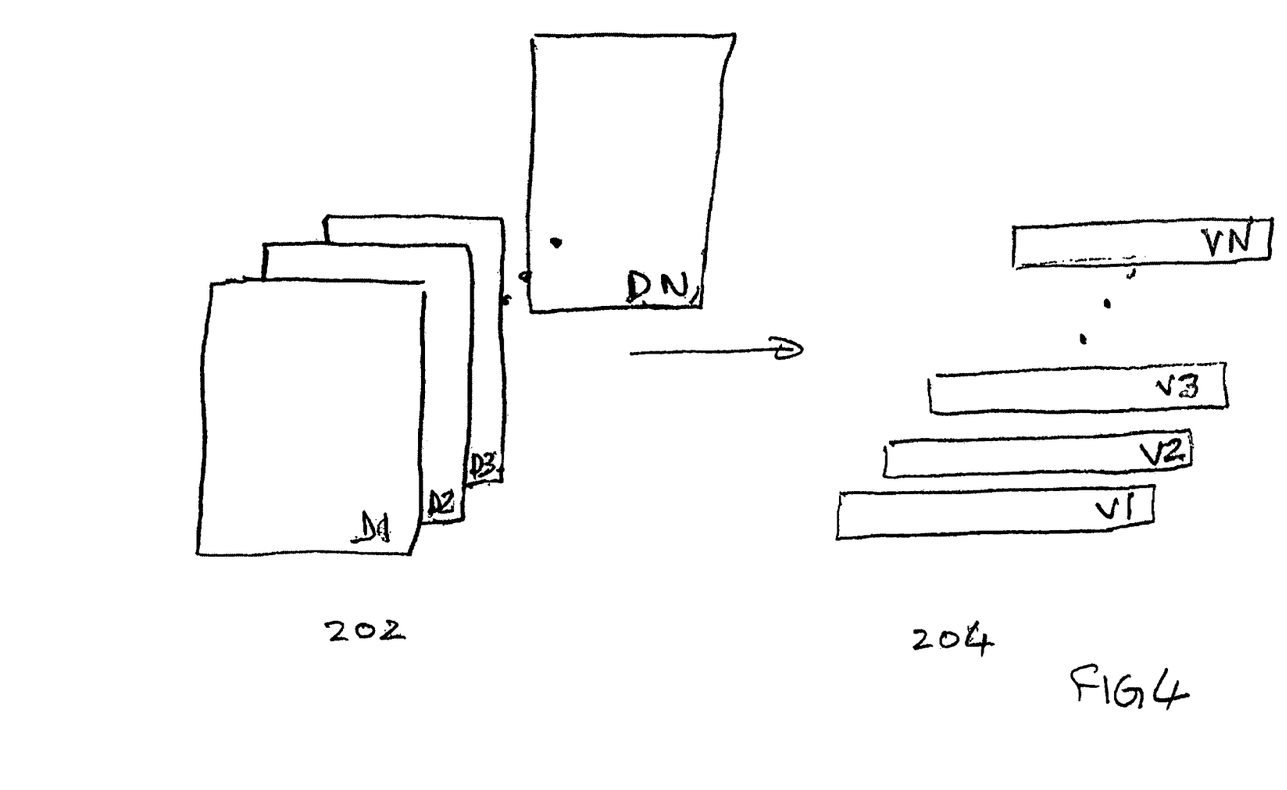
FIG. 4 is a schematic representation of an example of the generation of document vectors.

FIG. 4 is a schematic representation of the generation of document vectors (V1-VN) 204 from the documents (D1-DN) 202 described with reference to step 102 of FIG. 2. In order to generate the document vectors 204, a set of terms (e.g., words, phrases, groupings of words or phrases, etc) for a desired result are identified, and then each documents is searched for those terms. Then for each document a vector is generated with an entry in the vector for each term found in the document with a TF-IDF score for that term. It will be appreciated that each vector may only include entries for a subset of the complete set of terms, and that respective document vectors may include different numbers of entries corresponding to the terms found in the corresponding documents.

Figure 5:
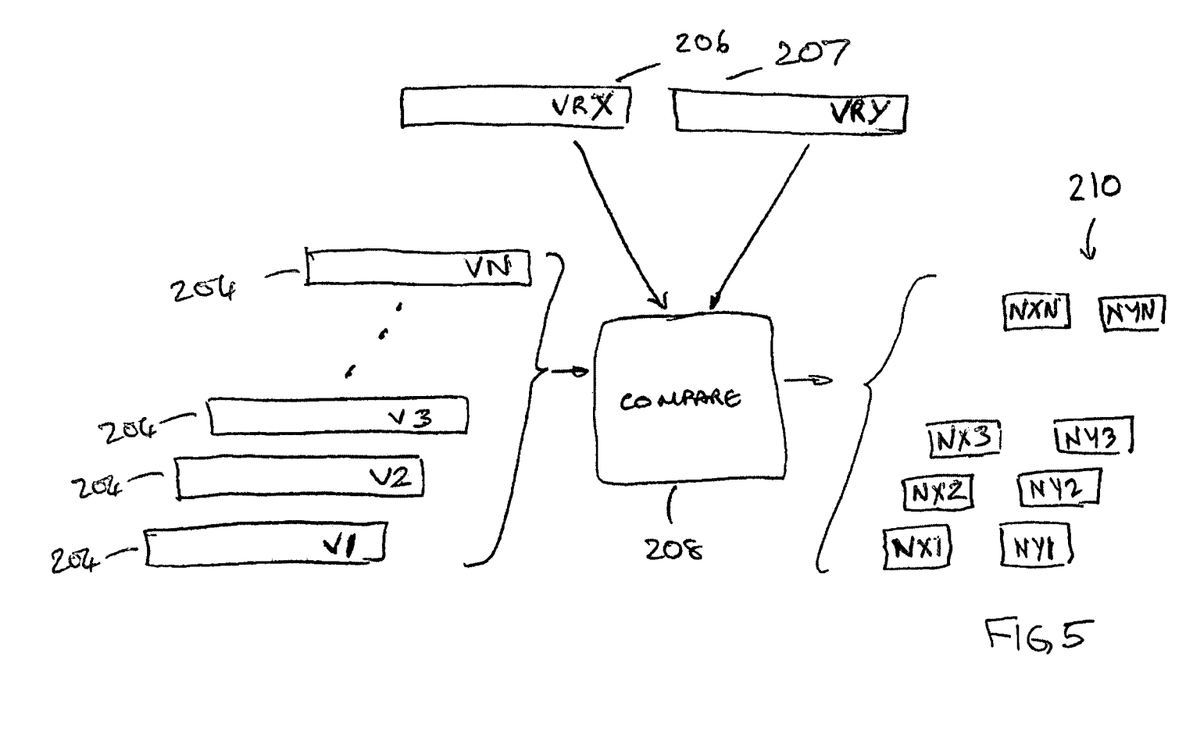
FIG. 5 is a schematic representation of an example of the generation of similarity values.

FIG. 5 is a schematic representation of the generation of similarity values (NX1-NXN and NY1-NYN) 210, described with reference to step 106 of FIG. 2, by the comparison 208 of the documents vectors 204 to first and second reference vectors RVX 206 and RVY 207 that each contain all the relevant terms that appear in the N document vectors and are each given random TF/IDF values for each vector.

Figure 6:
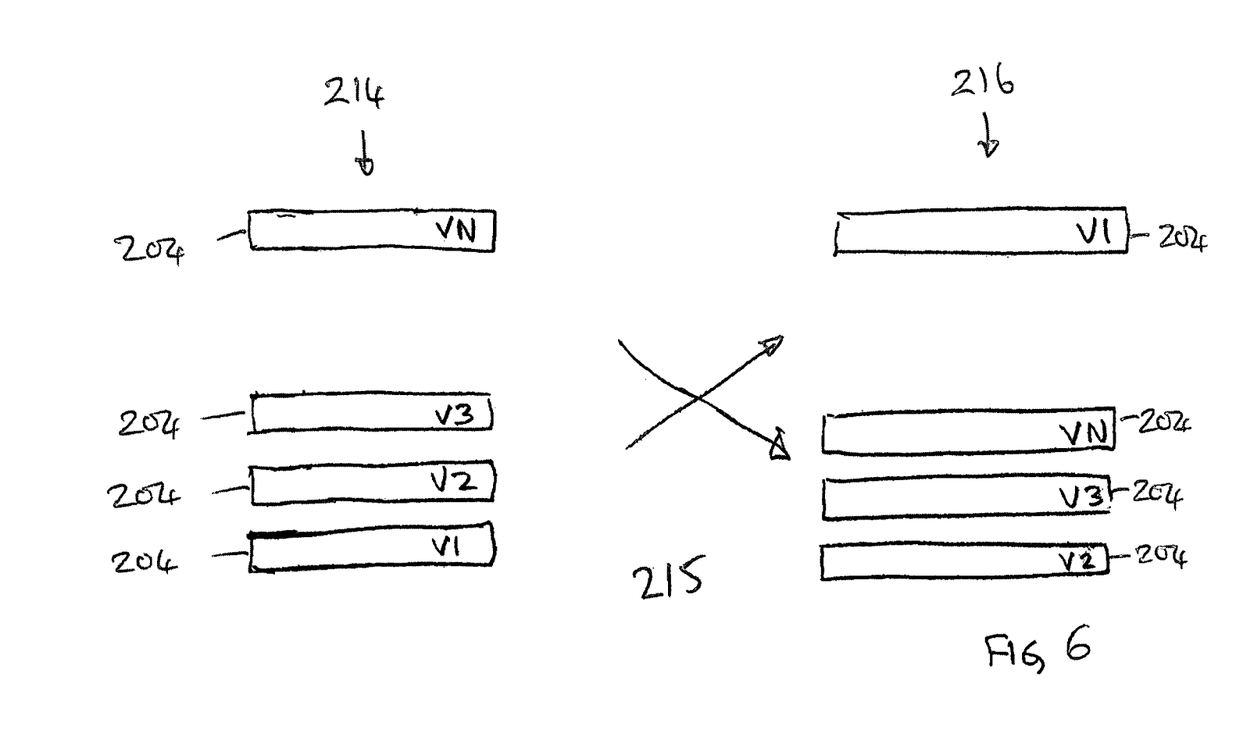
FIG. 6 is a schematic representation of an example of the sorting of documents vectors.

FIG. 6 represents the sorting 215 of the list 214 of documents vectors 204 in ascending or descending order by Xi and Yi coordinates, as described with reference to step 108 of FIG. 2, to group together the documents with similar characteristics into a sorted document list 216.

Figure 7:
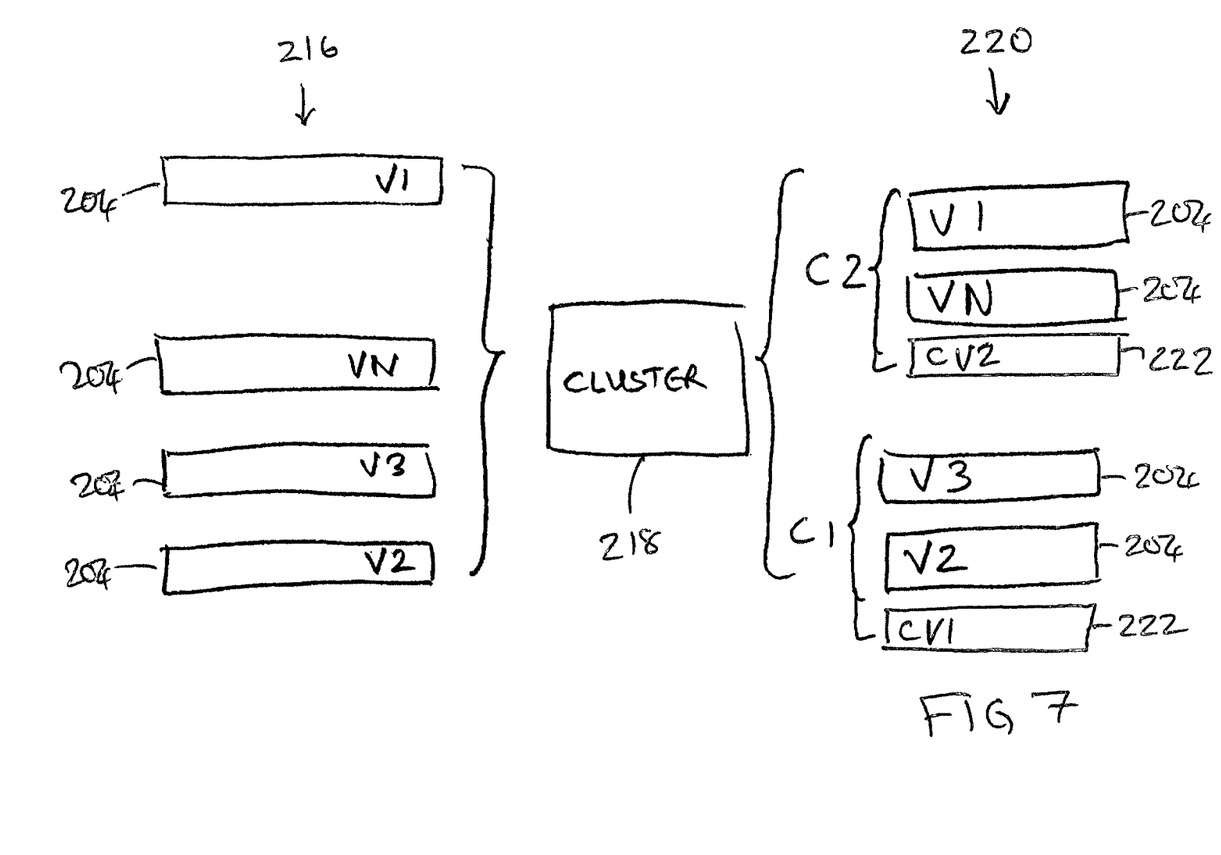
FIG. 7 is a schematic representation of an example of the formation of clusters.

FIG. 7 is a schematic representation of the clustering 218 of the documents based on comparing each document vector 204 in the sorted list 216 of document vectors formed in step 108 of FIG. 2 as described with reference to step 110 and FIG. 3 to form K clusters (C1, C2, etc.) 220, each of which includes the document vectors 204 for the documents of that cluster and the cluster vector (CV1, CV2, etc.) 222 for that cluster.

Figure 8:
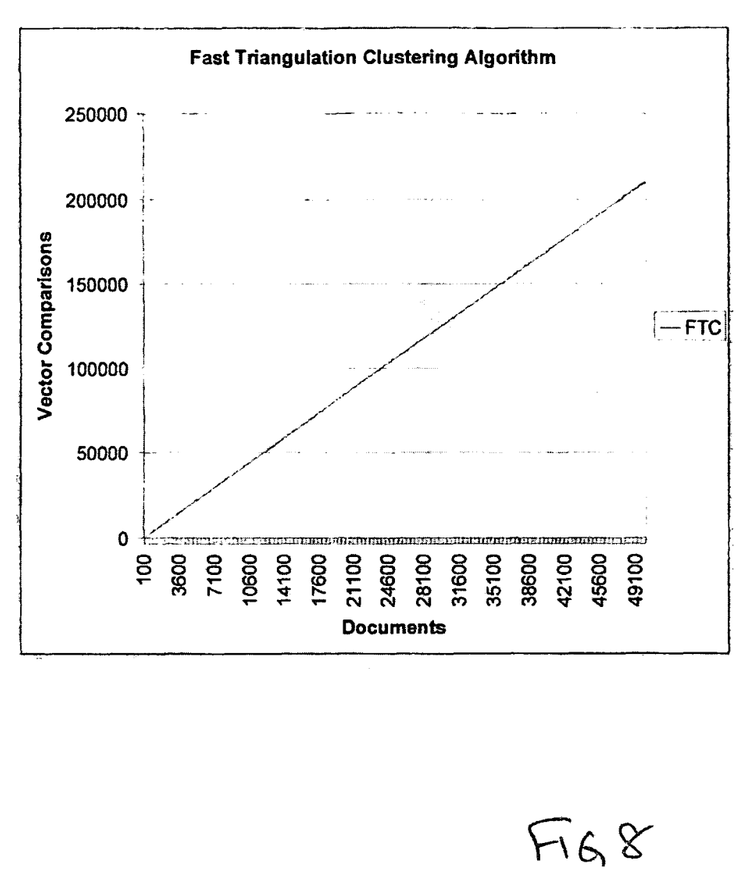
FIG. 8 is a graph representing the linear nature of the process described with reference to FIGS. 2 and 3.

FIG. 8 is a graph representing the linear nature of the process described with reference to FIGS. 2 and 3, assuming K (cluster comparisons) to be 20% of the original number of documents N.

An embodiment of the process can be implemented by means of special purpose hardware, or by means of computer software operating on conventional general purpose computer hardware.

Figure 9:
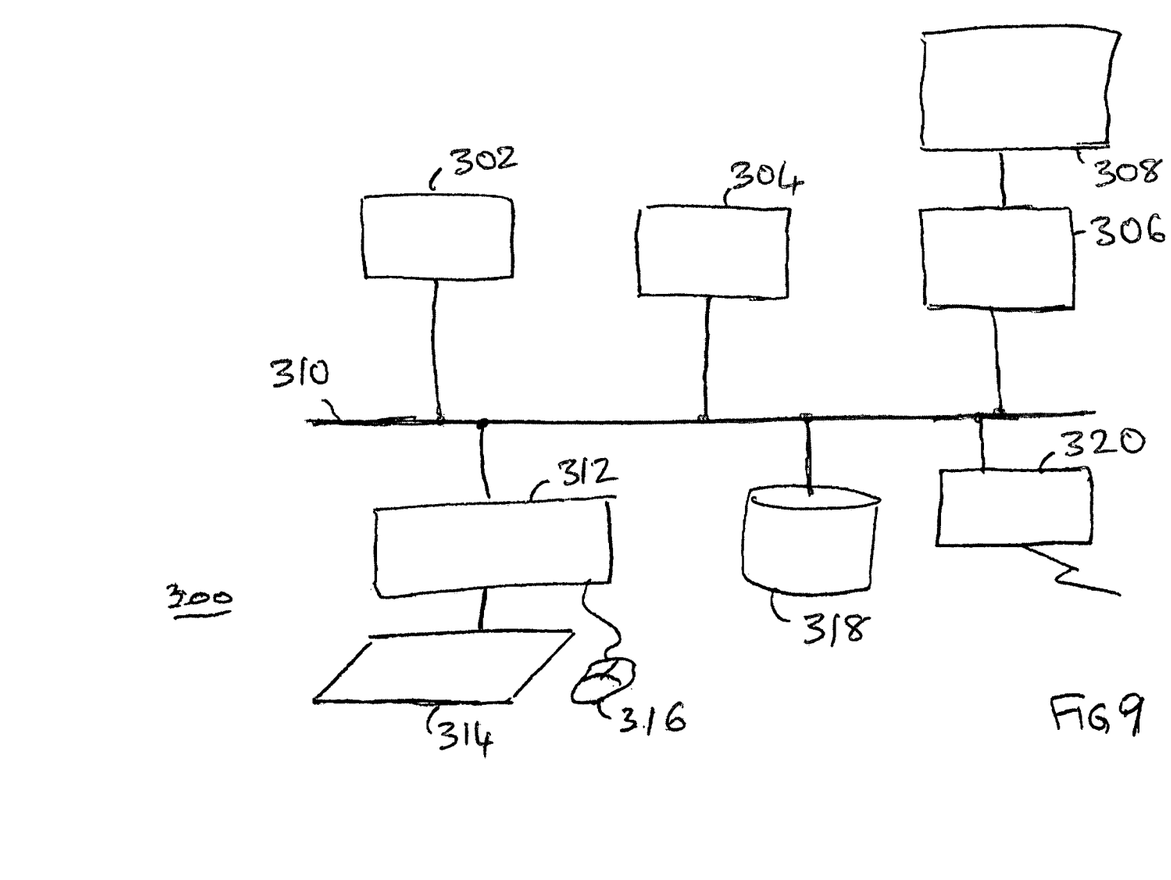
FIG. 9 is a schematic representation of elements of an example computer system for implementing the method of FIGS. 2 and 3.

FIG. 9 is a schematic representation of elements of a computer system 300 for implementing an embodiment of the invention. The computer system as shown in FIG. 9 includes one or more processors 302, memory 304 (e.g., read only and/or random access memory), a display adapter 306 connected to a display 308, an interface adapter 312 connected to one or more user input devices such as keyboard 314 and a mouse 316, storage 318 (e.g., a disk or solid state storage) and a communications adapter for connection to an external network. As illustrated in FIG. 9, the various components are connected via a bus structure 310. It will be appreciated that FIG. 9 is merely schematic and illustrative of components of a computer system, and that a computer system for implementing the invention can have other forms and/or a computer system for implementing the invention can comprise a plurality of computers.

Figure 10:
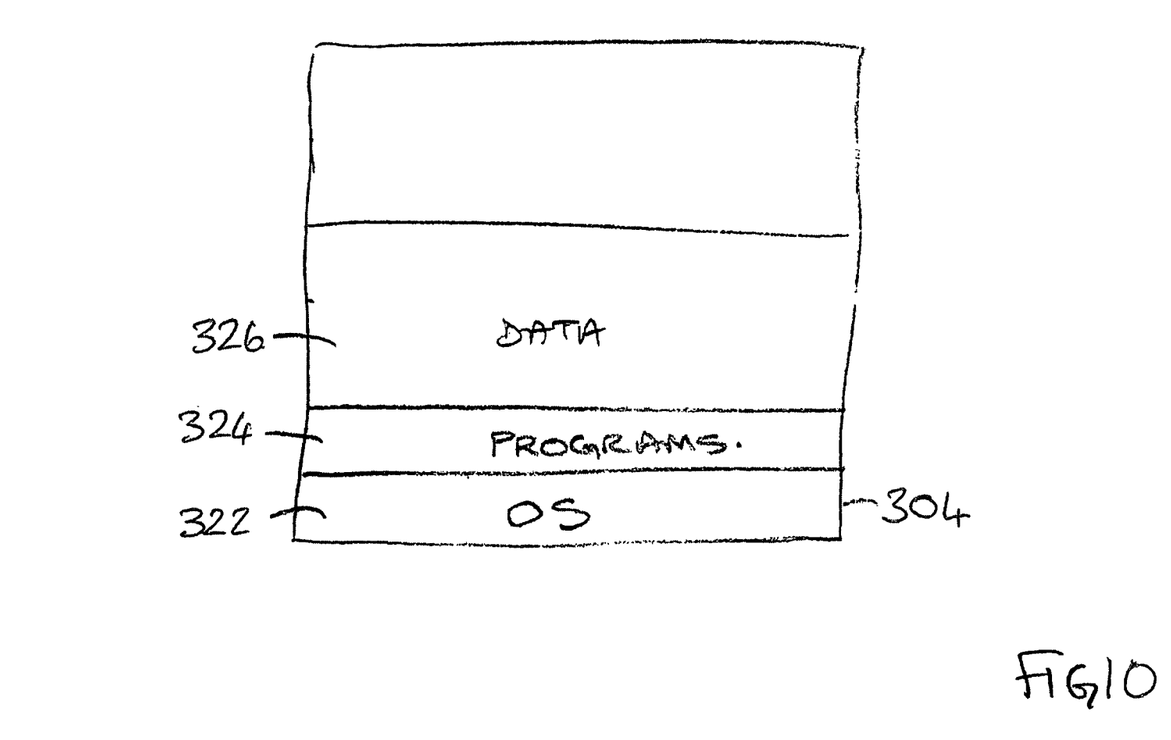
FIG. 10 is a schematic representation of contents of a memory of the computer system of FIG. 9.

FIG. 10 is a schematic representation of an example of the contents of the memory 304 during operation of a computer program implementing an example embodiment of the invention. Thus, the memory can include operating system components 322, program components 324 and data 326. The operating system components 322, program components 324 and data 326 can be loadable from the storage 318 on initiating the computer system for implementing an example embodiment of the invention.

A computer program product for implementing the invention can be in the form of a computer program on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

There has been described, a method and apparatus for clustering documents in which document vectors are formed for each of a plurality of documents of a corpus and plurality of reference vectors is generated. The document vectors are then compared to the reference vectors to generate similarity values for each of the document vectors. The document vectors are then sorted based on the similarity values for the document vectors to form a sorted list. Clusters are then formed based on the similarity between adjacent document vectors in the sorted list.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A system for clustering documents, the system comprising:
   one or more processors; and
   a memory storing program instructions executable by the one or more processors to implement:
      a first program component operable to generate a document vector for each of a plurality of documents of a corpus, wherein each document vector comprises a plurality of terms from the corresponding document and a frequency score for each term;
      a second program component operable to generate a plurality of reference vectors based on the document vectors, wherein each reference vector comprises a plurality of terms from the document vectors and a frequency score for each term, wherein the frequency score for each term in each reference vector comprises a random or pseudo-random value;
      a comparator operable to compare the document vectors to each of the reference vectors to generate similarity values for each of the document vectors;
      a sorter operable to sort the document vectors based on the similarity values for the document vectors to form a sorted list; and
      a cluster generator operable to form clusters of documents based on the similarity values between adjacent document vectors in the sorted list.

2. The system of claim 1, wherein the frequency score for each term in one of the document vectors comprises a TF-IDF score for that term in the document for that document vector.

3. The system of claim 1, wherein each reference vector comprises all terms for the documents of the corpus on which the document vectors are based.

4. The system of claim 1, wherein the terms include one or more of words, phrases, and groups of words or phrases.

5. The system of claim 1, wherein the sorter is operable to sort the document vectors in ascending order by the similarity values.

6. The system of claim 1, wherein the sorter is operable to sort the document vectors in descending order by the similarity values.

7. The system of claim 1, wherein the cluster generator is operable to form clusters of documents based on the similarity values between adjacent document vectors in the sorted list by iterating through the sorted list successively to determine if a next document has at least a predetermined similarity to a preceding document by the comparison of the document vectors.

8. The system of claim 7, wherein the cluster generator is operable, where a next document has at least a predetermined similarity to a preceding document, to add the next document to the cluster for the preceding document.

9. The system of claim 7, wherein the cluster generator is operable, where a next document does not have at least a predetermined similarity to a preceding document, to form a new cluster for that next document.

10. A computer implemented method of clustering documents, the method comprising:
generating document vectors for each of a plurality of documents of a corpus, wherein each document vector comprises a plurality of terms from the corresponding document and a frequency score for each term;
generating a plurality of reference vectors based on the document vectors, wherein each reference vector comprises a plurality of terms from the document vectors and a frequency score for each term, wherein the frequency score for each term in each reference vector comprises a random or pseudo-random value;
comparing the document vectors to each of the reference vectors to generate similarity values for each of the document vectors;
sorting the document vectors based on the similarity values for the document vectors to form a sorted list; and
forming clusters of documents based on the similarity values between adjacent document vectors in the sorted list.

11. The method of claim 10, wherein the frequency score for each term in one of the document vectors comprises a TF-IDF score for that term in the document for that document vector.

12. The method of claim 10, wherein each reference vector comprises all terms for the documents of the corpus on which the document vectors are based.

13. The method of claim 10, wherein the terms include one or more of words, phrases, and groups of words or phrases.

14. The method of claim 10, wherein the step of sorting the document vectors comprises sorting the document vectors in ascending order by the similarity values.

15. The method of claim 10, wherein the step of sorting the document vectors comprises sorting the document vectors in descending order by the similarity values.

16. The method of claim 15, wherein forming clusters of documents based on the similarity values between adjacent document vectors in the sorted list comprises iterating through the sorted list successively to determine if a next document has at least a predetermined similarity to a preceding document by the comparison of the document vectors.

17. The method of claim 16, wherein, where a next document has at least a predetermined similarity to a preceding document, the next document is added to the cluster for the preceding document.

18. The method of claim 16, wherein, where a next document does not have at least a predetermined similarity to a preceding document, a new cluster is formed for that next document.

19. A computer readable storage medium storing program instructions, the program instructions being executable to implement a method of clustering documents, the method comprising:
generating document vectors for each of a plurality of documents of a corpus, wherein each document vector comprises a plurality of terms from the corresponding document and a frequency score for each term;
generating a plurality of reference vectors based on the document vectors, wherein each reference vector comprises a plurality of terms from the document vectors and a frequency score for each term, wherein the frequency score for each term in each reference vector comprises a random or pseudo-random value;
comparing the document vectors to each of the reference vectors to generate similarity values for each of the document vectors;
sorting the document vectors based on the similarity values for the document vectors to form a sorted list; and
forming clusters of documents based on the similarity values between adjacent document vectors in the sorted list.

20. The computer storage medium as recited in claim 19, wherein the frequency score for each term in one of the document vectors comprises a TF-IDF score for that term in the document for that document vector.

21. The computer storage medium as recited in claim 19, wherein each reference vector comprises all terms for the documents of the corpus on which the document vectors are based.

* * * * *